No. 651,673. Patented June 12, 1900.
J. M. SPEAR & W. R. STRAW.
PIPE FASTENING.
(Application filed May 1, 1899.)
(No Model.)

WITNESSES:
L. Almquist
Isaac B. Owens.

INVENTORS
John M. Spear
Winnie R. Straw
BY
ATTORNEY

UNITED STATES PATENT OFFICE.

JOHN M. SPEAR AND WINNIE R. STRAW, OF PLAINFIELD, WISCONSIN.

PIPE-FASTENING.

SPECIFICATION forming part of Letters Patent No. 651,673, dated June 12, 1900.

Application filed May 1, 1899. Serial No. 715,210. (No model.)

*To all whom it may concern:*

Be it known that we, JOHN M. SPEAR and WINNIE R. STRAW, of Plainfield, in the county of Waushara and State of Wisconsin, have invented new and useful Improvements in Pipe-Fastenings, of which the following is a full, clear, and exact description.

The purpose of this invention is to provide superior means for permitting adjustment of the diameters of pipes, thimbles, elbows, and the like, so that they may be readily made to fit the parts with which they are to be used.

This specification is the disclosure of several forms of the invention, while the claims define the actual scope thereof.

Reference is to be had to the accompanying drawings, forming a part of this specification, in which similar characters of reference indicate corresponding parts in all the views.

Figure 1 is an elevation of our invention with part of the pipe broken away. Fig. 2 is a section on the line 2 2 of Fig. 1. Fig. 3 is a reduced view illustrating the application of the invention to an elbow, and Fig. 4 is a similar view illustrating the application of the invention to a thimble.

According to our invention, as shown in Figs. 1 and 2, the pipe 5 is split longitudinally and has lap 8 formed on one edge, such lap terminating short of the length of the pipe at the point 7. The other edge of the pipe is formed with an inward and laterally turned lap 6, locked with the lap 8 and extending throughout the length of the pipe. Throughout the length of the lap 8 the two edges of the pipe are fastened securely together by rivets. The end of the pipe at which the lap 8 terminates is arranged to be expanded or contracted at will to fit a second pipe received in the first. By cutting away the under lap 8 at the point 7 the upper lap will not engage the under lap, and thus the free sliding movement of the two edges of the pipe over each other is permitted at one end of the pipe. Fastened to the respective edges of the pipe at such end are lugs 9, which carry a screw 10, that extends across between the lugs and by means of which the lugs may be drawn together or spread apart, thus enlarging or contracting the diameter of the pipe. It may be seen that by turning the lap outward and the lap 6 inward the inner diameter of the pipe is not obstructed and a second pipe may fit snugly inside of the first pipe.

Figure 1:
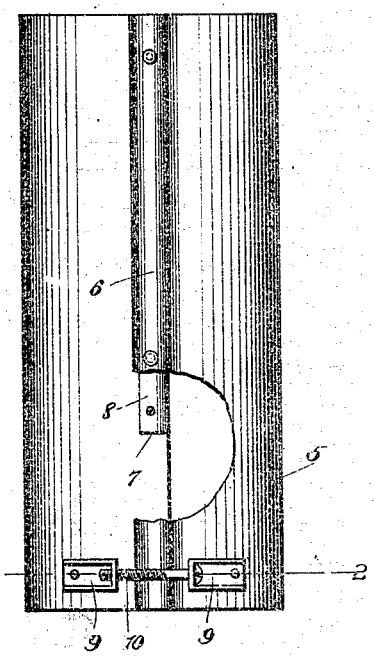
Figure 3:
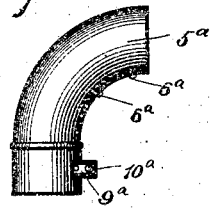
Fig. 3 shows the invention applied to an elbow-pipe $5^a$, in which the pipe has its edges joined by rivets $6^a$ instead of a seam. The end of the pipe to be expanded or contracted is not fastened by rivets, but is provided with lugs $9^a$, similar to the lugs 9, and provided with a screw $10^a$ for operating as the screw 10, previously described.
Figure 2:
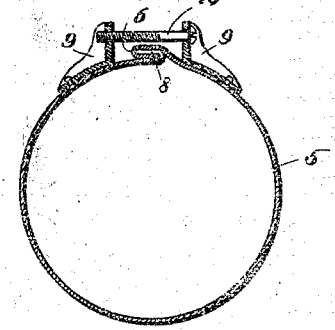
Figure 4:
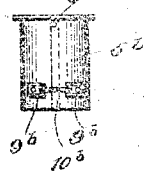
Fig. 4 shows a thimble $5^b$, in which the edges at the upper end of the thimble are joined by a rivet $6^b$. The lower end of the thimble has lugs $9^b$ attached thereto, and these lugs work with a screw $10^b$ or in the manner previously described.

Having thus described our invention, we claim as new and desire to secure by Letters Patent—

1. The combination of a pipe split longitudinally and having one of its longitudinal edges turned outward and laterally to form a lap, and having its other longitudinal edge turned inward and laterally to form a second lap, such laps being interengaged with each other, fastenings applied to such laps throughout part of the length of the pipe to securely join the edges of the pipe at such part, the fastenings leaving the edges at one end of the pipe free, and means mounted at such end of the pipe and connected with the two parts thereof by which to relatively move the same, and adjust the diameter of the pipe.

2. The combination of a pipe split longitudinally and having a part of one edge formed with a lap turned outward and laterally and extending a part of the length of the pipe, the pipe having at its other longitudinal edge a lap extended inward and laterally throughout the length of the pipe, the laps being interengaged and the pipe having its side edges fastened rigidly together throughout the length of the first-named lap, leaving the edges at one end of the pipe free, and means located at such end of the pipe and connected with the two parts thereof, by which to relatively move the same, and adjust the diameter of the pipe.

JOHN M. SPEAR.
WINNIE R. STRAW.

Witnesses:
M. E. MAITLAND,
L. W. CHAPMAN.